United States Patent [19]
Gerber et al.

[11] 3,971,036
[45] July 20, 1976

[54] PLOTTING HEAD FOR CONSUMABLE MARKING MATERIAL

[75] Inventors: Heinz Joseph Gerber, West Hartford, Conn.; Earle Merritt Chase, Wilbraham, Mass.

[73] Assignee: The Gerber Scientific Instrument Company, South Windsor, Conn.

[22] Filed: Oct. 30, 1974

[21] Appl. No.: 519,072

Related U.S. Application Data

[62] Division of Ser. No. 353,117, April 30, 1973, Pat. No. 3,857,527.

[52] U.S. Cl. .............................. 346/139 C; 33/18 R
[51] Int. Cl.² ........................................ G01D 15/24
[58] Field of Search .................... 346/139 C, 139 R; 33/18 R

[56] References Cited
UNITED STATES PATENTS

| | | | |
|---|---|---|---|
| 2,316,906 | 4/1943 | Wait | 346/139 C X |
| 2,375,267 | 5/1945 | Wise | 346/139 C |
| 3,293,658 | 12/1966 | Sicking | 346/139 R |
| 3,345,640 | 10/1967 | Sicking | 346/139 R |
| 3,398,452 | 8/1968 | Little et al. | 33/18 R |

*Primary Examiner*—Joseph W. Hartary
*Attorney, Agent, or Firm*—McCormick, Paulding & Huber

[57] ABSTRACT

A plotting head is provided for a slender shaft of consumable marking material, such as pencil lead or graphite, which is capable of producing uniform line intensity at any plotting speed as long as a light stylus pressure is applied to the shaft. The head includes a magazine capable of storing a plurality of such shafts, a feed mechanism for advancing the shaft of marking material as it is consumed during a plotting operation, and an indexing mechanism for rotating the magazine and placing a new shaft of marking material in registration with the feed mechanism each time a shaft is substantially consumed. A torque motor in the feed mechanism maintains a substantially uniform stylus pressure on the shaft when line traces are being drawn and also energizes the indexing mechanism to bring a new shaft of marking material into the plotting position when the old shaft is substantially consumed.

16 Claims, 4 Drawing Figures

PLOTTING HEAD FOR CONSUMABLE MARKING MATERIAL

CROSS REFERENCE TO RELATED APPLICATION

This application is a divisional application of Ser. No. 353,117 filed Apr. 30, 1973, now U.S. Pat. No. 3,857,525 issued Dec. 31, 1974 and entitled PLOTTING SYSTEM.

BACKGROUND OF THE INVENTION

The present invention relates to a plotting head which is moved relative to a sheet of recording material in a plotting machine to produce a graphic display either directly on the material or on other mediums in subsequent developing or printing processes.

One of the most important characteristics of a plotter is its ability to produce graphic information of uniform, high quality. Quite apart from accuracy, the graphic information should be clear, of high contrast and uniform intensity. With the advent of numerically controlled plotters and higher plotting speeds, the difficulty of maintaining traces of uniform character and high contrast at many different plotting speeds has led to controlled wet ink systems such as disclosed in U.S. Pat. No. 3,781,907, issued Dec. 25, 1973 and entitled APPARATUS AND METHOD FOR EXPRESSING WRITING FLUID FROM A PLOTTING PEN issued to the assignee of the present invention. Plotting heads capable of maintaining high quality line characteristics at all speeds are still being striven for.

It is, accordingly, a general object of the present invention to provide a plotting head which utilizes a slender shaft of consumable marking material such as graphite or pencil lead. Such materials maintain line traces of uniform character and high contrast at various plotting speeds and avoid the complexities and potential blotching of wet ink systems described above.

SUMMARY OF THE INVENTION

The present invention relates to a plotting head which employs a slender shaft of consumable marking material, for example graphite. Support means hold the shaft of the consumable marking material in a plotting position with one end of the shaft adjacent a recording medium such as a strip of recording paper. Means are provided for pressing the shaft toward the recording medium as the one end is consumed.

Utilizing a consumable marking material has several advantages. In situations where the material takes the form of a graphite stick or the like such as used in mechanical pencils, the line traces produced by the plotting head have a uniform intensity and width regardless of the relative speeds of the plotting head and recording medium.

DESCRIPTION OF THE PREFERRED EMBODIMENTS

Figure 1:
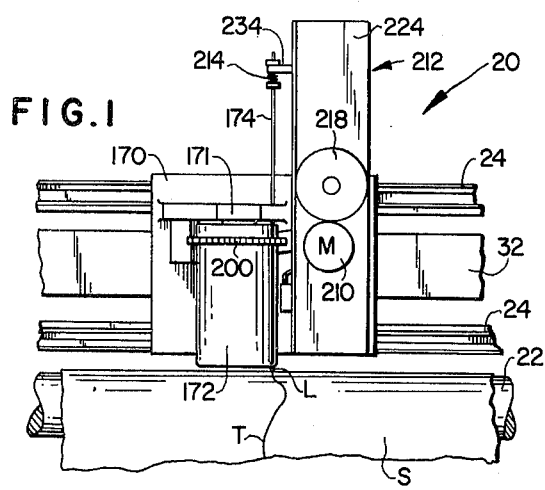
FIG. 1 is an elevation view of a plotting head of the present invention cooperating with a strip of recording material on a plotting drum.

FIG. 1 shows in elevation a plotting head 20 which is specifically adapted to plot line traces T on a strip S of recording material such as paper with a consumable marking material. The plotting head may be utilized in various different types of plotting systems but is illustrated in FIG. 1 in a drum-type plotter in which the head 20 translates linearly on a pair of guide rails 24 laterally of the strip S of recording material while the strip is translated longitudinally of itself on a plotting drum 22 relative to the head and the guide rails. For a more complete description of such a plotting system and the manner in which the plotting head is utilized in the system reference may be had to U.S. Pat. No. 3,857,525 referenced above.

The plotting head 20 may be filled with a graphite cartridge or pencil lead L that rests on the strip S over the plotting drum 22 as the head 20 and strip are moved relative to one another. Although graphite is mentioned in particular, any slender shaft of consumable marking material including pastels, crayons or dye markers may be used with equally satisfactory results. The advantage of using a shaft of consumable marking material, particularly pencil lead, is that the intensity of the traces produced by the lead remains substantially constant regardless of the relative speed between the strip and head. Uniform line width is maintained due to the constant cross-section of the lead. Because of its consumable characteristics, however, it is necessary to provide a feed mechanism which continually advances the lead as the end of the lead resting against the sheet material is consumed. In one embodiment of the head, a plurality of leads are carried so that a great deal of plotting can be performed between refilling operations, or multicolored graphic displays can be made.

As illustrated in FIG. 1, the plotting head 20 includes a carriage plate 170 which rides on the parallel guide rails 24 back and forth over the plotting drum 22 and the strip S in response to the controlled movements of the motor driven drive belt 32. Attached to a bracket 171 on the carriage plate 170 is a magazine 172 in which a plurality of pencil leads L or other consumable marking material are carried. A feed ram 174 registers with one of the leads in the magazine and presses the lower end of the lead against the strip S during a plotting operation. As the lower end of the lead is consumed, the ram also feeds the lead through the magazine toward the plotting drum 22. When the end of a line trace is reached, the pressure applied by the ram 174 to the lead is released and in the absence of the pressing force, the lead does not produce a trace. When the entire lead is consumed, the ram 174 is withdrawn from the magazine 172 and the magazine is indexed to bring another lead under the ram for continued plotting. A more detailed description of the plotting head 20 follows in connection with the description of FIGS. 2–4.

The magazine 172 is rotatably mounted on the carriage plate 170 by means of a stationary support shaft 180 suspended at its upper end in fixed relationship from the bracket 171 and a pair of roller bearings 182 and 184 interposed between the shaft 180 and the magazine. The bearings 182 and 184 hold the magazine against axial displacement on the shaft 180 so that the ram 174 can press the lead L downwardly relative to the magazine onto the strip S of the recording material.

Figure 4:
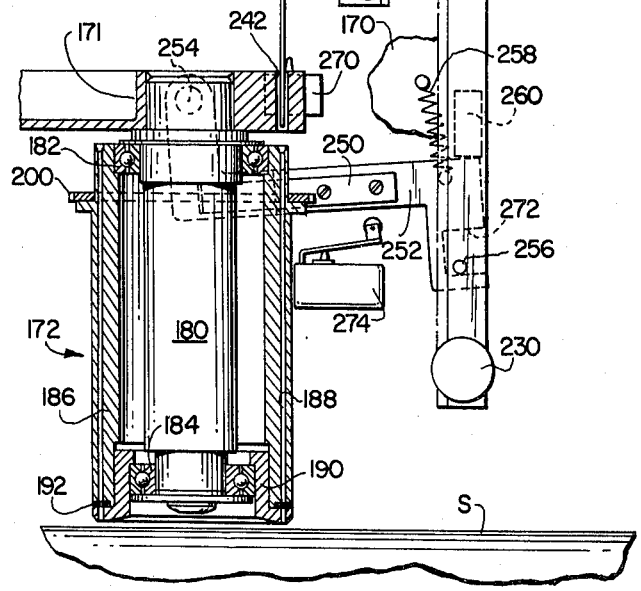
FIG. 4 is an enlarged cross sectional view showing a fragmentary portion of the magazine for holding consumable marking material.
Figure 4:
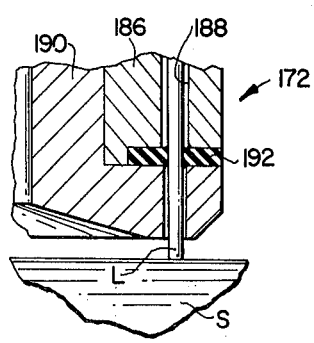

The magazine includes an outer barrel 186 having a plurality of evenly spaced channels or compartments 188 in a circular array and parallel to the axis of rotation of the magazine for housing the leads L in loose fitting or sliding relationship. Between the lower end of the barrel 186 and the bearing 184 is a flanged collar 190 which contains apertures registering with the channels 188 so that the lead L can be pressed out of the bottom of the magazine onto the recording material. Interposed between the collar 190 and the barrel 186 as shown clearly in FIG. 4 is a flexible gasket 192 having an aperture for each of the channels 188; however, the apertures in the gasket are slightly smaller in cross-section than the channels so that a piece of lead which slides through the channels in the magazine is captured in the gasket and is prevented from falling out of the magazine except under the force of the ram 174. Furthermore, the gasket 192 may possess sufficient flexibility to lift a lead off of the recording material whenever the pressure applied by the ram 174 is released. Positive retraction of the lead from the recording material is not essential; however, it may be desirable particularly with consumable marking materials which are softer than pencil leads and have a tendency to make marks even without pressure from the ram.

Figure 3:
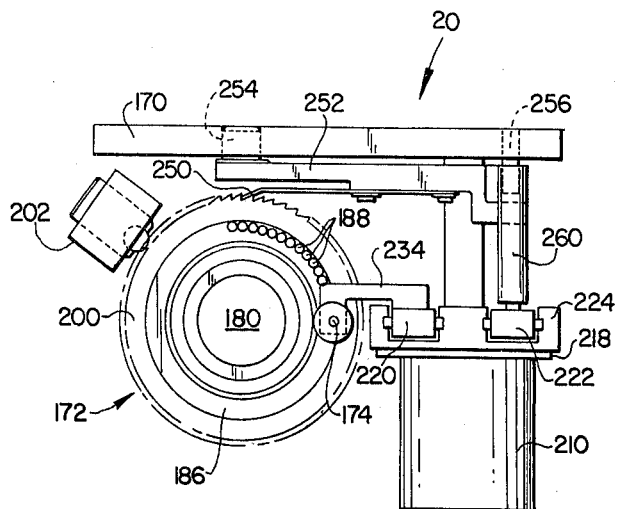
FIG. 3 is an enlarged top plan view of the plotting head in FIG. 1 with portions removed for clarity.

Circumscribing the upper end of the barrel 186 is a ratchet 200 which is also fixedly attached to the barrel for indexing the barrel and the channels 188 relative to the ram 174. As shown in FIG. 3, a ball detent 202 engages the ratchet teeth to hold the magazine 172 in each of a plurality of index positions wherein one of the channels 188 registers with the ram 174. In the embodiment illustrated, each tooth of the ratchet 200 corresponds to one of the channels 188 so that indexing of the magazine 172 by one ratchet tooth brings the ram 174 into registration with the next adjacent channel 188.

The mechanism which actuates the ram 174 also indexes the magazine 172. Before discussing the indexing mechanism, it is appropriate to consider the manner in which the ram 174 is operated to press and feed a lead through the magazine.

The actuating mechanism for the ram 174 includes a torque motor 210, a mass-balanced drive linkage comprised of a gear rack mechanism 212 and a coupling spring 214 interposed between the rack mechanism 212 and the ram 174. The drive shaft of motor 210 is connected to the rack pinion gear 216 by means of a large reduction gear 218 shown most clearly in FIGS. 1 and 2. The gear rack mechanism 212 includes two gear racks 220 and 222 which reciprocate in alternating fashion up and down in a common rack guide housing 224. Each end of the rack 220 carries a roller 228 which moves up and down in a guide channel in the housing 224. In the same manner the rack 222 includes rollers 230 which slide up and down in a corresponding guide channel in the housing. The housing 224 is fixedly mounted to the carriage plate 170 to guide the racks and the ram 174 in the vertical direction or a direction perpendicular to the axis of rotation of the plotting drum and the strip S of recording material at the point of contact with the material. A support arm 234 is rigidly connected to the rack 220 and projects laterally from the rack to the ram 174. The end of the support arm 234 carries a bushing 236 through which the ram 174 passes in sliding relationship to the arm. Clamping blocks 238 and 240 are fixed to the ram above and below the arm 234 with the spring 214 interposed between the arm and the lower clamping block 240. The ram is thusly connected to the rack 220 and torque motor 210 through a resilient coupling.

Figure 2:
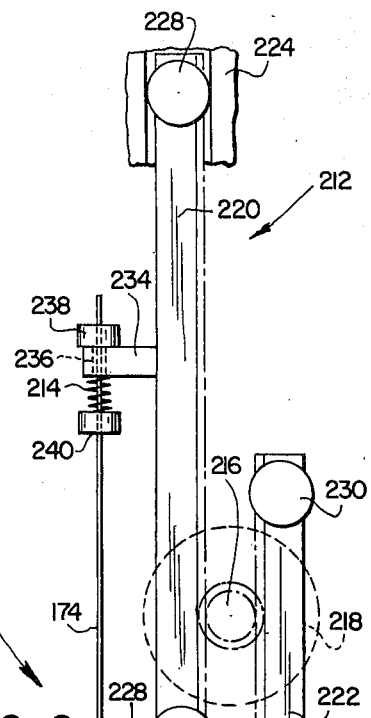
FIG. 2 is an enlarged cross sectional view of the plotting head in FIG. 1 with portions removed for clarity.

In operation, the torque motor 210 is energized and the rack 220 presses the feed ram 174 downwardly through a guide channel 242 in the bracket 171 as shown in FIG. 2 and into the tapered upper end of a channel 188 in the magazine 172. If a lead is in the channel 188, the lower end of the ram 174 makes contact with the lead and pushes the lower end of the lead through the gasket 192 out of the magazine and into contact with the strip of recording material on the plotting drum 22. As long as the torque motor 210 remains energized, a constant force or stylus pressure will be applied from the ram to the lead and a line trace will be generated on the recording material. As the lower end of the lead is consumed in a plotting operation, the torque motor 210 continues to advance the ram 174 through the channel 188 and thereby feeds the lead as needed. When the end of a programmed trace is reached, the torque motor 210 is deenergized to relieve the stylus pressure on the lead and, therefore, no further mark is produced on the recording material The coil spring 214 forms a resilient coupling between the torque motor 210 and the lead and in conjunction with the mass-balanced gear rack mechanism 212 isolates high-frequency vibrations between the ram 174 and the motor 210 so that any roughness of the plotting drum on the recording material is not coupled back to the motor 210. This isolation permits a very light loading of the ram 174 by the motor.

The mass-balanced gear rack mechanism 212 is also desirable because it allows a small quantity of energy to be stored in the compressed spring 214 during a plotting operation, and at the end of a line trace when the torque motor 210 is deenergized, the stored energy imparts a slight movement to the mass-balanced linkage. During this movement, the slight momentum acquired by the rack mechanism carries the support arm 234 and the ram 174 upwardly out of contact with the lead in the channel 188. Consequently, it is not necessary to reverse the torque motor 210 each time the end of a programmed trace is reached to insure that no pressure is exerted on or no weight rests on the lead which would cause marks to be produced on the strip.

As shown on the plan view of the data head 20 in FIG. 3 where the support bracket 171 on the carriage plate 170 has been removed for clarity, the magazine 172 is indexed by means of pawl 250 carried by a lever 252 pivotally mounted in the carriage plate 170 on a pin 254. As the lever 252 oscillates, the resilient end of the pawl 250 indexes the magazine 172 by one tooth on the ratchet 200.

As shown in FIG. 2 the lever 252 is normally held against a dead pin 256 in the plate 170 at the position illustrated by a return spring 258 extending between the carriage plate 170 and the lever. The lever is actuated to index the magazine by a laterally projecting stud 260 mounted on the gear rack 222 so that contact is made with the lever 252 during downward movement of the rack 222 immediately after the lower end of the ram 174 is withdrawn from a channel 188 in the magazine 172. The downward motion of the rack 222 causing an indexing operation is initiated by reversing the direction of excitation and rotation of the torque motor 210 when the lower clamp block 240 on the ram 174 makes contact with a limit switch 270 indicating a low-lead condition. If the switch 270 is actuated while a trace is being made, the controller for the plotting system will continue the plotting operation until the end of the trace is reached. At that point, torque motor 210 is reversed and the rack 220 is raised until the ram 174 is withdrawn from the magazine 172. At that same time, the rack 222 moves down and the stud 260 pushes the lever 252 downwardly against the spring 258 while the pawl 250 engaging the ratchet 200 indexes the ratchet 200 and magazine. The downward motion of the rack 222 under the driving forces of torque motor 210 is limited by the dead pin 256 fixed in the carriage plate 170 and the rectangular cutout 272 in the lever 252. The cutout 272 is selected to cause the pawl 250 to push the ratchet a distance equal to one ratchet tooth and, since each ratchet tooth corresponds to one of the channels 188, the magazine 172 is indexed to move the next magazine channel into registration with the ram 174. The ball detent 202 then locks the magazine in the new position.

A microswitch 274 positioned directly below the lever 252 is actuated after the magazine has been indexed. Actuation of the switch 274 informs the controller for the plotting system that the indexing operation has been completed and the head 20 and plotting drum 22 can be moved to the starting point of the next trace. When the starting point is reached, the rotation of torque motor 210 is reversed by the controller and the ram 174 moves downwardly into a channel 188 into contact with the newly indexed lead. Also, the return spring 258 moves the lever 252 and pawl to the position illustrated in FIG. 2 for the next indexing operation. If the new channel does not have any lead, the ram 174 moves directly to the bottom of its stroke and contacts switch 270 to initiate another indexing operation. The switch 274 may be used to count the number of indexing operations in the controller for the system. When the count reaches a sum equal to the number of channels 188 distributed around the periphery of the magazine 172, a "lead-out" signal may be given and the controller may inhibit any further plotting until the magazine is reloaded and the controller is reset.

While the present invention has been described in a preferred embodiment, it should be understood that still other modifications and substitutions can be had without departing from the spirit of the invention. For example, the specific structure illustrating the data head 20 for use with consumable marking material may be varied in detail as desired. It is not essential that the mechanical linkage connecting the torque motor 210 and feed ram 174 be a mass-balanced linkage; however, such linkage in the present application is desirable because it aids in high-frequency isolation and insures removal of pressure from the lead whenever the motor is turned off without having to reverse the motor. The dual rack mechanism 212 also provides a means for actuating the indexing mechanism connected to the magazine 172. A snubbing device can be connected to the mass-balanced linkage to damp the motions or forces carried by the linkage. The constant stylus pressure applied to the lead by the ram can be made adjustable by an adjustable resistor regulating the excitation voltage for the torque motor 210. Other motors such as an air cylinder can be substituted for the torque motor to produce the constant stylus pressure. The flexible gasket 192 at the lower end of the magazine 172 can be replaced with equivalent resilient retainers allowing the lead to be pressed through the magazine but prohibiting the lead from falling loosely onto the plotting paper under its own weight. Accordingly the present invention is described in several forms by way of illustration rather than limitation.

We claim:

1. In a plotting system in which a recording medium and a plotting head are moved relative to one another to generate graphical information on the medium, the plotting head employing slender shafts of consumable marking material comprising:

support means including a magazine for holding a plurality of shafts of consumable material with one shaft in a plotting position and with one end of said one shaft adjacent the recording medium; the magazine being rotatably mounted about an axis on the plotting head and having a plurality of compartments distributed circumaxially about the axis for holding the plurality of shafts in parallel relationship with the axis and said one shaft in the plotting position;

means registering with said one shaft in said plotting position in the magazine for pressing said one end of said one shaft in the plotting position against the recording medium and for feeding said shaft toward the recording medium as said one end of said shaft is consumed; and means for indexing the rotatable magazine to bring another consumable shaft in a magazine compartment into the plotting position in precise registration with the means for pressing and feeding when said shaft in the plotting position is substantially consumed.

2. The plotting head of claim 1 wherein the
   means for pressing and feeding comprises a motor and an actuating mechanism connecting with the consumable shaft and energized by the motor to displace the shaft toward the recording medium.

3. The plotting head of claim 2 wherein the magazine compartment is a support channel in which the consumable shaft is slidably received.

4. The plotting head of claim 2 wherein:
   the actuating mechanism includes a resilient member interposed between the motor and the shaft to provide resilient coupling and a displacement ram coupled to the motor and extending coaxially of the consumable shaft in the compartment of the magazine.

5. The plotting head of claim 2 wherein the actuating mechanism includes a mass-balanced linkage and a resilient coupling interconnecting the consumable shaft and the motor.

6. The plotting head of claim 2 wherein:
   the actuating mechanism includes a gear rack and pinion coupled to the consumable shaft and the motor is a torque motor connected in driving relationship to the pinion.

7. The plotting head of claim 2 wherein:
   the actuating mechanism includes a mass-balanced gear rack and pinion system and a resilient coupling between the rack and pinion system and the consumable shaft; and the motor is a torque motor connected to the pinion of the rack and pinion system.

8. The plotting head of claim 1 wherein the means for automatically indexing comprises means for detecting substantial consumption of the shaft of marking material and initiating an indexing operation.

9. The plotting head of claim 1 further including means for counting the indexing operations.

10. The plotting head of claim 1 wherein the means for automatically indexing is responsive to the means for pressing and feeding.

11. The plotting head of claim 1 wherein
the magazine is a barrel structure having the plurality of compartments distributed in a circular array about an axis of rotation of the barrel on the plotting head, each of the compartments being formed by a channel extending parallel to the axis of rotation from one end of the barrel to the other.

12. The plotting head of claim 11 further including
a flexible gasket mounted adjacent one end of the barrel structure and intersecting at least one of the channels, the gasket having an aperture registering with the one of the channels and being smaller in size than the cross section of the channel, whereby a shaft of consumable marking material may be carried loosely in the channel and captured in the aperture of the flexible gasket by a limited retaining force permitting movement through the magazine by the pressing and feeding means.

13. The plotting head of claim 1 wherein
the means for pressing comprises means for urging the shaft toward the recording medium with substantially constant pressure.

14. The plotting head of claim 1 further including:
means for signalling a condition of substantial consumption of the consumable marking material; and wherein:
the means for indexing the magazine is responsive to the means for signalling.

15. The plotting head of claim 1 wherein:
the means for pressing and feeding said shaft of consumable marking material includes a displacement ram located coaxially in registration with said shaft, and motor means connected with the ram for advancing the ram and said shaft through the compartment of the magazine and for withdrawing the ram from the magazine when the shaft is consumed; and,
the means for indexing has a movable member engaging the magazine for indexing thereof and the movable member is engaged with and energized by the motor means of the pressing and feeding means for indexing the magazine after the displacement ram is withdrawn from the magazine.

16. The plotting head of claim 15 including:
means for signalling substantial consumption of the shaft in the plotting position; and wherein:
the motor means is responsive to the signalling means to withdraw the displacement ram from the magazine.

* * * * *